United States Patent [19]
Fujimoto

[11] Patent Number: 4,827,379
[45] Date of Patent: May 2, 1989

[54] ELECTRICAL FACILITY

[75] Inventor: Tsunetomo Fujimoto, Amagasaki, Japan

[73] Assignee: Mitsubishi Denki Kabushiki Kaisha, Japan

[21] Appl. No.: 127,460

[22] Filed: Dec. 2, 1987

[30] Foreign Application Priority Data

Dec. 16, 1986 [JP] Japan .................. 61-194113[U]

[51] Int. Cl.$^4$ ............................................. H02B 1/20
[52] U.S. Cl. .................................. 361/428; 52/79.8;
361/331; 361/332
[58] Field of Search ............... 52/63, 79.1, 79.7, 79.8,
52/109, 173 DS, 234; 135/97; 174/35 MS, 48;
105/8.1, 15, 458; 361/331–333, 380, 393–396,
399, 428–429

[56] References Cited

U.S. PATENT DOCUMENTS 4,250,669 2/1981 Freeauf .............................. 52/79.8
4,313,149 1/1982 Hirose et al. ....................... 361/394
4,405,143 9/1983 Rosenkrands ....................... 105/8.1

FOREIGN PATENT DOCUMENTS 55-49481 12/1980 Japan.
60-190106 12/1985 Japan.

OTHER PUBLICATIONS

McKnight et al., "Prebuilt Control Houses Reduce Substation Costs", Transmission Distribution, Nov. 1985, pp. 54, 58, 60, and 62.

Primary Examiner—A. D. Pellinen
Assistant Examiner—Gregory D. Thompson
Attorney, Agent, or Firm—Leydig, Voit & Mayer

[57] ABSTRACT

An electrical facility including a plurality of housings each having at least three connecting ports in the opposite end portions and a side portion and having housed therein various electrical devices. An expandable connecting joint connects the housings at their connecting ports, a wiring duct is disposed in the lower portion of the connecting joint, and a tread board is disposed on the wiring duct. Thus, the electrical units within the housings are connected to provide functions similar to an integral facility.

4 Claims, 3 Drawing Sheets

ELECTRICAL FACILITY

BACKGROUND OF THE INVENTION

This invention relates to an electrical facility in which a plurality of housings containing various electrical equipment such as an electrical power distribution center are connected to each other so that they can function as an integral facility and can be operated and inspected as a unit.

FIGS. 1 and 2 are a plan view and a front view, respectively, of a conventional power distribution facility disclosed in for example Japanese Utility Model Laid-Open No. 60-190106. In the figures, the electrical facility comprises a housing 1 having side walls at four sides, a bottom wall and a top wall (not shown in the figures), and having connecting ports 1a and 1b, the connecting ports 1a being provided with a door 2. Various electrical devices 3 are disposed and housed within each housing 1 arranged in a unit or units, the electrical devices including switchgears, monitor control panels, batteries, air conditioners, etc. In order to connect the housing 1 to each other, a passage unit 4 comprising four side walls, a bottom wall and a top wall (not shown in the figure) is provided. The passage unit 4 is provided with connecting ports 4a each having a door 5 and connected to the housing 1 through a packing by bolts (not shown) so that ingress of rain water is prevented. The electrical facility also comprises foundations or mounting beds 6 and 7 for mounting the housing 1 and the passage unit 4, respectively, thereon, and a staircase 8 for the entrance to the housing 1.

Each of the housings 1 in which the electrical equipment 3 is disposed is arranged to have an outer shape and weight that allow easy shipping.

The conventional facility as above described is assembled as follows. First, the housing 1 containing the electrical device 3, the passage unit 4, the mounting beds 6 and 7 and the staircase 8 are shipped and transported to the installation site.

Next, the mounting beds 7 and the passage unit 4 are installed, and the respective housings 1 are installed on the mounting beds 7 so that the connecting ports 1b and 4a are aligned. At this time, the passage unit 4 and the housing 1 must be connected in a water-tight relationship by means of a packing. At the respective connecting port 1b or 4a, wiring ducts and air conditioner ducts are connected so that the connected components function as a unitary electrical power distribution center. The access to the power distribution center is provided by the staircase 8 and the door 2.

With the above-described conventional electrical facility, the passage unit 4 is needed for connecting the housings 1, increasing the cost and the installation area needed. Also, the water-tight connection between the housing 1 and the passage unit 4 is difficult to establish, because it requires a highly accurate positioning of the housings 1 relative to the passage unit 4. Moreover, because of the structure of the passage unit 4, installation of additional housing 1 to expand the facility is difficult.

SUMMARY OF THE INVENTION

Accordingly, an object of the present invention is to provide an electrical facility in which the housings can be easily connected without using a passage unit.

Another object of the invention is to provide an electrical facility in which the cost and the amount of space occupied can be decreased.

A still other object of the present invention is to provide an electrical facility in which additional installation of housings to expand the facility can be easily achieved.

With the above objects in view, the electrical facility of the present invention comprises housings in which various electrical devices are disposed and which are provided with at least three connecting ports in the opposite end portions and a side portion of the housing. The housings are connected to each other by an expandable connecting joint, and a wiring duct and a tread board are disposed between the housing.

According to the present invention, since at least three connecting ports are provided at the opposite end portions and a side portion of the housing, the housings can be connected at right angles or in straight line. Since an expandable connecting joint is interposed between the housings, the degree of freedom in connecting two housings is very high.

BRIEF DESCRIPTION OF THE DRAWINGS

The present invention will become more readily apparent from the following detailed description of the preferred embodiments taken in conjunction with the accompanying drawings, in which.

The same reference numerals designate identical or corresponding components throughout the figures.

DESCRIPTION OF THE PREFERRED EMBODIMENTS

Figure 1:
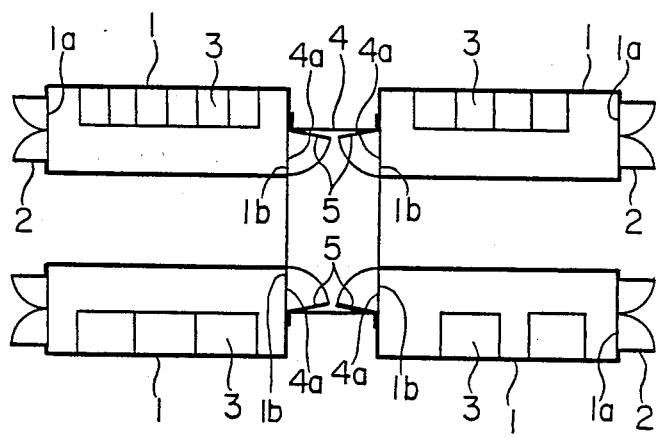
FIG. 1 is a plan view showing the conventional electrical facility with the roof of the housings removed.
Figure 2:
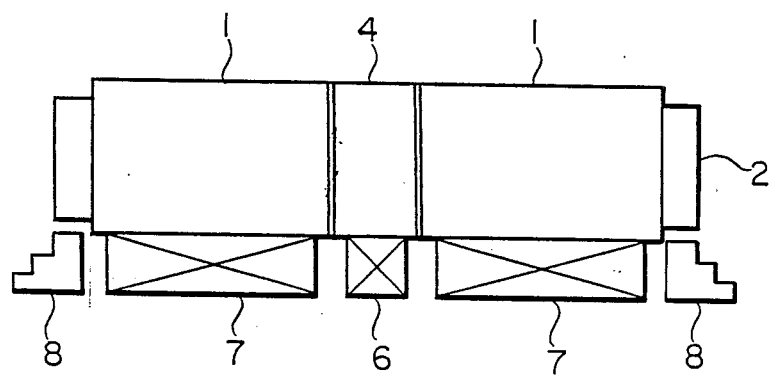
FIG. 2 is a front view of FIG. 1.
Figure 3:
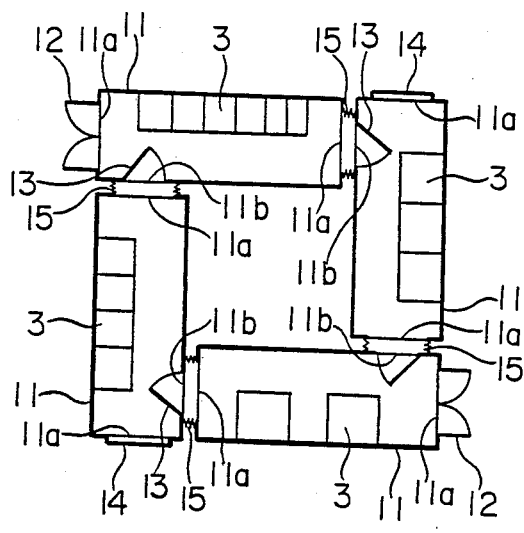
FIG. 3 is a plan view showing one embodiment of an electrical facility of the present invention with the roof of the housings removed.
Figure 4:
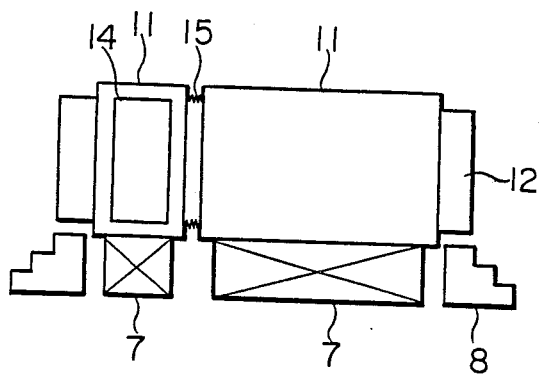
FIG.4 is a front view of FIG. 3.

FIGS. 3 and 4 are a plan view and a front view, respectively, illustrating one embodiment of the electrical facility of the present invention. The components designated by the reference numerals 3, 6, 7 and 8 are identical to those of the above-described conventional device so that the description thereof is omitted. The electrical facility comprises a plurality of housings 11 each having four side walls, a bottom wall and roof (not shown) and being provided with connecting ports 11a at opposite ends. The entrance comprises a door 12 and the outer end is closed by a cover plate 14. A connecting port 11b is formed on one side of the housing 11 and a door 13 is provided for closing the connecting port 11b. Each housing 11 contains therein various electrical devices 3, such as switchgears, monitor control panels, batteries, air conditioners, etc.

Figure 5:
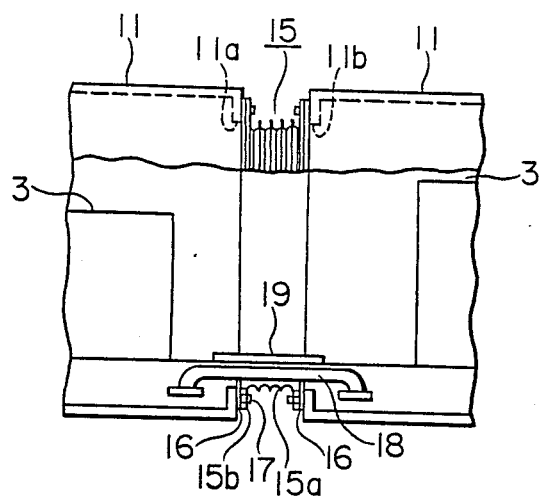
FIG. 5 is a fragmental enlarged view of the connecting portions of the housings shown in FIG. 4.

An expandable connecting joint 15 connects the housing 11 and is constructed as illustrated in FIG. 5. Flanged portions 15b are attached to opposite ends of the expandable bellows portion 15a, and the expandable joint 15 is connected to the housing 11 at the flanged portion 15b by bolts 17 through the packing 16 to prevent ingress of rain water. A wiring duct 18 is mounted in the lower portion of the connecting joint 15 and a tread board 19 is mounted above it to facilitate the passage of maintenance personnel. If the interior of the housing 11 is to be air-conditioned, an air conditioning duct connected between the housings 11 is disposed in the lower portion of the connecting joint 15.

Thus, the electrical devices 3 disposed within each of the plurality of housings 11 are arranged to be operated and maintained under the same conditions as that where the electrical devices are installed within a single common housing.

At the connecting ports 11a of the housing 11 which is provided with the door 12 and which is used as an entrance passage, a staircase 8 is externally disposed.

The housing 11 within which the electrical device 3 is housed has an outer shape and weight that allow easy shipping.

The assembly of the electrical facility of the above embodiment is carried out as follows. From among the housings 11 in which the electrical devices 3 are housed and the foundations 7 that were shipped and carried to the installation site, the foundations 7 are first positioned and installed. Then, the housings 11 are placed on the foundations 7 with their corresponding connecting ports 11a and 11b positioned to be spaced apart by a predetermined distance and in an aligned relationship. Thereafter, each of the housings 11 is secured to their respective foundations 7. Then between the connecting portions of the housings 11, the expandable connecting joint 15 is mounted and connected. The wiring duct 18 is disposed in the lower portion of the interior of the connecting joint 15 and the tread board 19 is mounted above it. Thus, the connecting portions between the housings 11 are connected with a higher degree of freedom by the connecting joint 15, so that a water-tight connection can be achieved without the need for the precise alignment of the housings 11, to facilitate assembly.

Figure 6:
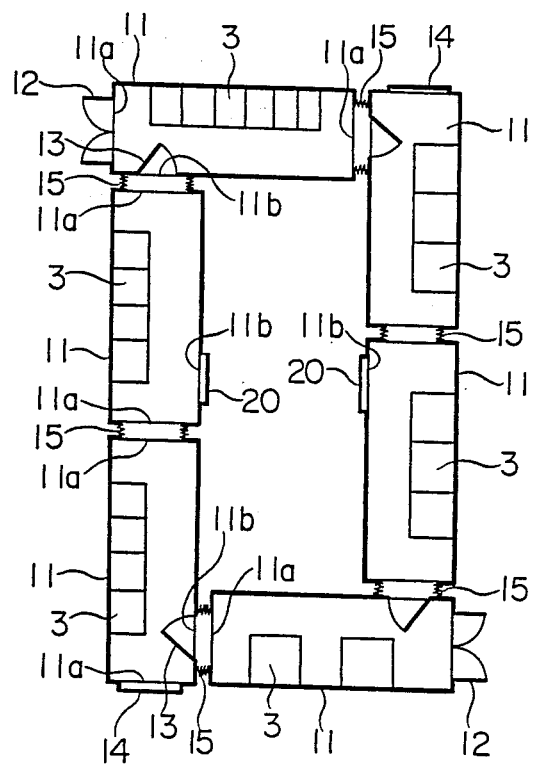
FIG. 6 is a plan view showing the electrical facility of another embodiment of the present invention with the roof of the housings removed.

While the electrical facility is constructed by connecting four housings 11 in the embodiment illustrated in FIG. 3, two more housings 11 can be additionally connected as shown in FIG. 6, which illustrates another embodiment of the present invention. The connecting ports 11b not in use are closed by the cover plate 20.

Thus, by making each housing 11 the same configuration, the arrangement and the positions of the entrances can be selected with a high degree of freedom, and additional installations and connection can be easily made to expand the electrical facility.

The number of housings 11 and the arrangement and the connection of the housings 11 may be changed from that shown in the above embodiment according to neccessity.

Also, while all the housings 11 should preferably be in the same shape with a view towards facilitating manufacture, slightly modified housings can be equally used.

Further, although three connecting ports are provided at the opposite end portions and one side portion of the housing 11 in the above embodiment, an additional connection port may be provided in the side portion according to neccessity.

As has been described, according to the present invention, housings are provided with at least three connecting ports in the opposite end portions and a side portion of the housing, the housings being connected to each other by an expandable connecting joint, with a wiring duct and a tread board disposed between the housings. Therefore, the housings can be easily connected, costs can be decreased, the area needed for installation is decreased, and the time period for assembly and installation can be shortened. Further, the housings can be connected in various arrangements with a high degree of freedom, facilitating the additional installation.

What is claimed is:

1. An electrical facility comprising:
a plurality of housings, each housing having opposite end portions, a side portion, a connecting port in each of the opposite end portions, and a connecting port in the side portion and each housing having housed therein various electrical devices;
expandable connecting joint connecting said housings at their connecting ports;
a wiring duct disposed within said connecting joint; and
a tread board disposed within said connecting joint, whereby the electrical devices within said housings are connected.

2. An electrical facility as claimed in claim 1 wherein said electrical facility is an electrical power distribution center.

3. An electrical facility as claimed in claim 1 wherein the expandable connecting joint has a lower portion and the wiring duct is disposed in the lower portion of the expandable connecting joint.

4. An electrical facility as claimed in claim 3 wherein the tread board is disposed above the wiring duct.

* * * * *